(12) United States Patent
Niijima et al.

(10) Patent No.: US 12,131,626 B2
(45) Date of Patent: Oct. 29, 2024

(54) TEXTURE PRESENTATION DEVICE, TEXTURE PRESENTATION METHOD, AND PROGRAM

(71) Applicant: Nippon Telegraph and Telephone Corporation, Tokyo (JP)

(72) Inventors: Arinobu Niijima, Musashino (JP); Toki Takeda, Musashino (JP); Takafumi Mukouchi, Musashino (JP); Takashi Sato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 252 days.

(21) Appl. No.: 17/913,362

(22) PCT Filed: Apr. 24, 2020

(86) PCT No.: PCT/JP2020/017645
§ 371 (c)(1),
(2) Date: Sep. 21, 2022

(87) PCT Pub. No.: WO2021/214967
PCT Pub. Date: Oct. 28, 2021

(65) Prior Publication Data
US 2023/0126419 A1  Apr. 27, 2023

(51) Int. Cl.
*H04B 3/36* (2006.01)
*G08B 6/00* (2006.01)

(52) U.S. Cl.
CPC ...................... *G08B 6/00* (2013.01)

(58) Field of Classification Search
CPC . G08B 6/00; G06F 3/016; G06F 3/011; A61C 19/00
See application file for complete search history.

(56) References Cited

U.S. PATENT DOCUMENTS

| 2019/0064927 A1 | 2/2019 | Tachi et al. |
| 2020/0402418 A1* | 12/2020 | Sasagawa ............... A61B 5/42 |

(Continued)

FOREIGN PATENT DOCUMENTS

| JP | 6631746 | 12/2019 |
| WO | WO 2017175867 | 10/2017 |
| WO | WO 2019163908 | 8/2019 |

OTHER PUBLICATIONS

Tajima et al., "Tactile Sensation Reproducing Method of a Haptic Display that Presents Force, Vibration, and Temperature as Haptic Primary Colors," Transactions of the Virtual Reality Society of Japan, 2019, 24(1):125-135, 28 pages (with English Translation).

(Continued)

*Primary Examiner* — Toan N Pham
(74) *Attorney, Agent, or Firm* — Fish & Richardson P.C.

(57) ABSTRACT

A food texture presentation apparatus of the present embodiment includes a force stimulation presentation unit, a vibration stimulation presentation unit, and a temperature stimulation presentation unit that present different kinds of haptic stimuli in the oral cavity, a selection unit that selects a haptic stimulus to be presented, according to the food texture, and a force stimulation controller, a vibration stimulation controller, and a temperature stimulation controller that control respectively the force stimulation presentation unit, the vibration stimulation presentation unit, and the temperature stimulation presentation unit that present the selected haptic stimulus.

12 Claims, 3 Drawing Sheets

(56) References Cited

U.S. PATENT DOCUMENTS

| | | |
|---|---|---|
| 2021/0312226 A1 | 10/2021 | Nakayama et al. |
| 2022/0054243 A1* | 2/2022 | Beckman ............... A46B 9/045 |
| 2023/0143499 A1* | 5/2023 | Niijima .................... G06F 3/01 |
| | | 700/94 |

OTHER PUBLICATIONS

Uemura et al., "Development of a Food Simulator," Transactions of the Virtual Reality Society of Japan, 2003, 8(4):399-406, 17 pages (with English Translation).

* cited by examiner

TEXTURE PRESENTATION DEVICE, TEXTURE PRESENTATION METHOD, AND PROGRAM

CROSS-REFERENCE TO RELATED APPLICATIONS

This application is a National Stage application under 35 U.S.C. § 371 of International Application No. PCT/JP2020/017645, having an International Filing Date of Apr. 24, 2020.

The disclosure of the prior application is considered part of the disclosure of this application, and is incorporated by reference in its entirety into this application.

TECHNICAL FIELD

The present disclosure relates to a food texture presentation apparatus, a food texture presentation method, and a program.

BACKGROUND ART

The spread of virtual reality technology has made it possible to experience a virtual reality space with a sense of realism. A technology for presenting a virtual food texture in addition to a visual sense and a hearing sense has been studied. NPL 1 proposes a virtual food texture presentation technology to which a haptic sense presentation technology is applied as an elemental technology for providing a virtual food experience.

NPL 2 discloses a technology for reproducing various haptic senses by combining three elements including force, vibration, and temperature.

CITATION LIST

Non Patent Literature

NPL 1: Takahiro Uemura, et al., "Development of a Food Simulator", Transactions of the Virtual Reality Society of Japan, 2003, Volume 8, Issue 4, pp. 399-406

NPL 2: Yuki Tajima, et al., "Tactile Sensation Reproducing Method of a Haptic Display that Presents Force, Vibration, and Temperature as Haptic Primary Colors", Transactions of the Virtual Reality Society of Japan, 2019, Volume 24, Issue 1, pp. 125-135

SUMMARY OF THE INVENTION

Technical Problem

It is conceivable that the reality of the virtual food texture can be improved by presenting three elements including the force, the vibration, and the temperature, which are components of a haptic sense. In order to present the three elements including the force, the vibration, and the temperature, separate haptic actuators are used for each element. For example, a DC motor is used for presenting the force, a vibration motor is used for presenting the vibration, and a Peltier element is used for presenting the temperature.

When the food texture is presented by using a plurality of haptic actuators, if the haptic actuators are not synchronized, a quality of reality deteriorates. Because various motors and Peltier elements have different delay times when driving, the force, the vibration, and the temperature may be presented out-of-sync. As a result, unfortunately, the quality of reality of the virtual food texture deteriorates.

The present disclosure has been made in view of the above, and an object of the present disclosure is to present more realistic food texture.

Means for Solving the Problem

A food texture presentation apparatus according to an aspect of the present disclosure includes a plurality of presentation units that present different kinds of haptic stimuli in an oral cavity, a selection unit that selects one of the haptic stimuli according to a food texture to be presented, and a controller that controls a presentation unit of the plurality of presentation units corresponding to the selected one of the haptic stimuli.

A food texture presentation method according to an aspect of the present disclosure is a food texture presentation method of presenting a food texture by using a plurality of presentation units that present different kinds of haptic stimuli in an oral cavity, the food texture presentation method including selecting, by a computer, one of the haptic stimuli according to the food texture to be presented, and controlling, by the computer, a presentation unit of the plurality of presentation units corresponding to the selected one of the haptic stimuli.

Effects of the Invention

According to the present disclosure, it is possible to present more realistic food texture.

DESCRIPTION OF EMBODIMENTS

An embodiment of the present disclosure will be described below with reference to the drawings.

Figure 1:
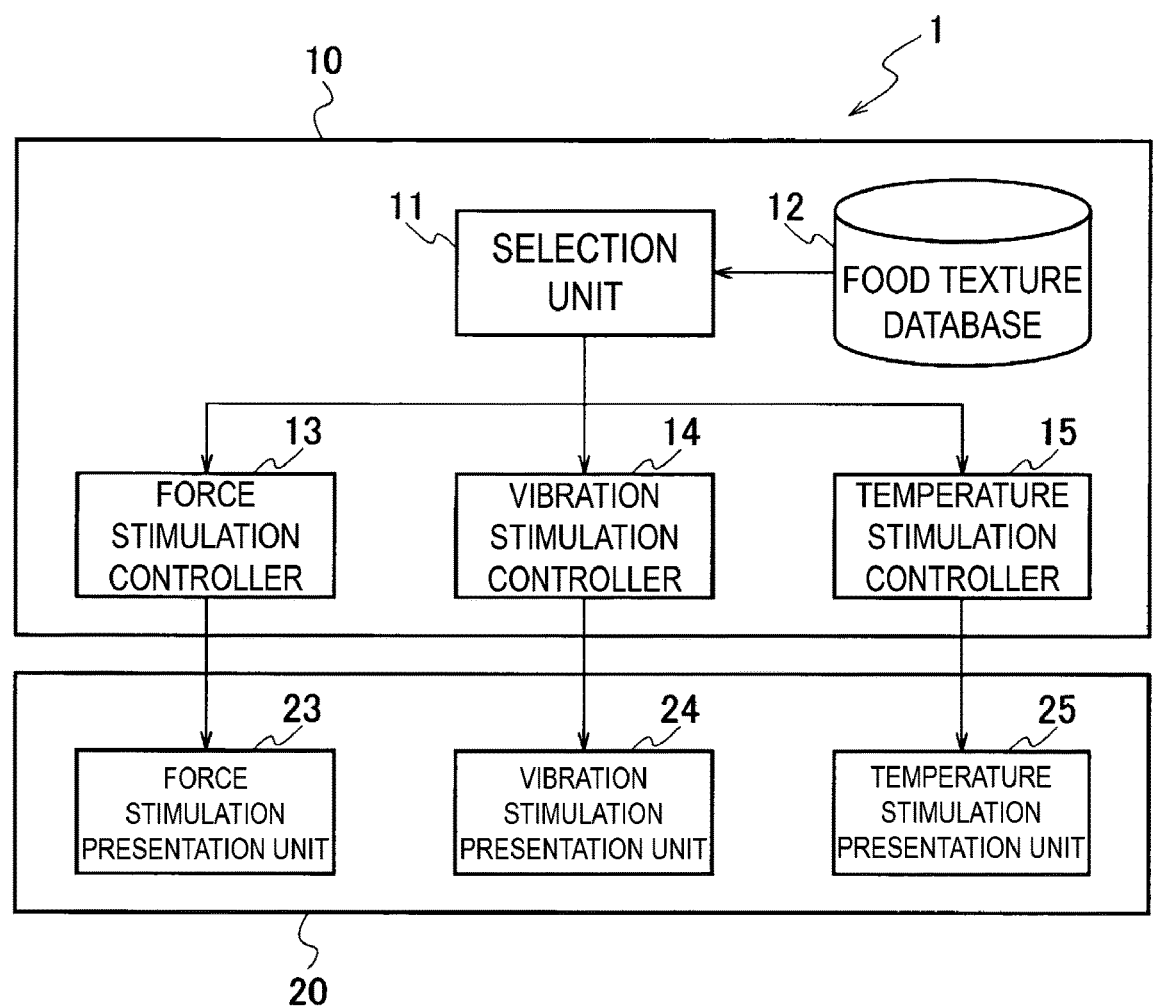
FIG. 1 is a functional block diagram illustrating an example of a configuration of a food texture presentation apparatus in the present embodiment.

A food texture presentation apparatus 1 illustrated in FIG. 1 includes a selection device 10 and a presentation device 20. The selection device 10 selects a haptic stimulus to be operated based on a food texture to be presented. The presentation device 20 is a device to be inserted into or worn in an oral cavity and presents a user with the haptic stimulus selected by the selection device 10. In FIG. 1, the selection device 10 and the presentation device 20 are configured as separate devices but are not limited to this configuration. The selection device 10 and the presentation device 20 may be configured by a single device. Each unit of the selection device 10 and the presentation device 20 may be configured by separate devices.

The selection device 10 includes a selection unit 11, a food texture database 12, a force stimulation controller 13, a vibration stimulation controller 14, and a temperature stimulation controller 15. The presentation device 20 includes a force stimulation presentation unit 23, a vibration stimulation presentation unit 24, and a temperature stimulation presentation unit 25.

The food texture database 12 stores a parameter for controlling the presentation device 20 for each food texture. As the food texture, names of foods such as a beef jerky and a rice cracker are set. The parameter is set for each of the haptic stimuli of force, vibration, and temperature. A plurality of parameters may be set for each haptic stimulus. For example, for the haptic stimulus of the force, after setting the parameter of hardness, the parameter of stress applied to an external force is set if the food texture is hard, and a spring coefficient is set if the food texture is soft. For the haptic stimulus of the vibration, the parameters of amplitude, frequency, vibration time, and the like are set. For the haptic stimulus of the temperature, the parameter of the temperature is set. The parameter of the temperature may express the temperature in several stages, such as cold, hot, or warm temperature. The parameter is not limited to the above. Numerical values such as a current value and a drive time for controlling the presentation device 20 may be set as the parameter.

The parameter is searched in advance and registered in the food texture database 12. For example, in the presentation device 20, the food texture is presented while each of the parameters of the haptic stimulus of the force, the haptic stimulus of the vibration, and the haptic stimulus of the temperature are changed, and the parameter close to a desired food texture is searched. The found parameter is registered in the food texture database 12.

The food texture database 12 may store, instead of the parameter of each food texture, onomatopoeia indicating the food texture such as chewy or crispy. For example, for the food texture of a food product for which the parameter has not been found, the onomatopoeia is registered. The food texture database 12 maps the onomatopoeia and a discriminative haptic stimulus corresponding to the onomatopoeia. For example, regarding the chewy, the haptic stimulus of the force with the soft food texture is mapped. The parameters of a rice cake and a daifuku (soft rice cake stuffed with sweet bean paste) associated with chewy may be used. Regarding the crispy, the haptic stimulus of the vibration is mapped.

The food texture database 12 may designate the haptic stimulus to be most emphasized for each food texture. For example, for the food texture of a beef jerky, the force stimulus is designated as the haptic stimulus to be most emphasized, for the food texture of a rice cracker, the vibration stimulus is designated, and for the food texture of an ice cream, the temperature stimulus is designated.

The selection unit 11 refers to the food texture database 12, selects the haptic stimulus to be most emphasized (force, vibration, or temperature) in the food texture to be presented, and issues an instruction to the controller corresponding to the selected haptic stimulus.

When a haptic stimulus to be most emphasized is designated in the food texture database 12, the selection unit 11 selects the haptic stimulus. The selection unit 11 may select the haptic stimulus having the parameter deviating from an average value of the parameters calculated from all the food textures. When the onomatopoeia is used, the haptic stimulus mapped to the onomatopoeia is selected.

The selection unit 11 acquires the parameter of the selected haptic stimulus from the food texture database 12 and transmits the acquired parameter to the corresponding controller.

The force stimulation controller 13 controls the force stimulation presentation unit 23. The force stimulation presentation unit 23 is, for example, a haptic actuator that uses a DC motor and applies stress corresponding to the user's biting force. The force stimulation presentation unit 23 can express hardness when a food product is bitten.

The vibration stimulation controller 14 controls the vibration stimulation presentation unit 24. The vibration stimulation presentation unit 24 is, for example, a haptic actuator that uses a vibration motor and gives the user vibration when the user bites. The vibration stimulation presentation unit 24 can express the food texture obtained when the food product that has been bitten and broken down is repeatedly bitten and broken down.

The force stimulation presentation unit 23 and the vibration stimulation presentation unit 24 are, for example, members to be inserted into the oral cavity of the user and include a pressure sensor to detect that the user has bitten. The force stimulation controller 13 and the vibration stimulation controller 14 operate the force stimulation presentation unit 23 and the vibration stimulation presentation unit 24, respectively, when the user bites the presentation device 20.

The temperature stimulation controller 15 controls the temperature stimulation presentation unit 25. The temperature stimulation presentation unit 25 is, for example, a haptic actuator that uses a Peltier element to present a cold stimulus or a warm stimulus. The Peltier element is an element in which one surface is heated and the other surface is cooled when a direct current flows. When the direction of the direct current is changed, the heated surface and the cooled surface are switched. With the temperature stimulation presentation unit 25, it is possible to express the food texture characterized by temperature, such as an ice cream or a shaved ice.

As the temperature stimulation presentation unit 25, the Peltier element may be disposed at portions of the force stimulation presentation unit 23 and the vibration stimulation presentation unit 24 which are in contact with the inside of the oral cavity, or the temperature stimulation presentation unit 25 may be worn in the oral cavity as a member different from the force stimulation presentation unit 23 and the vibration stimulation presentation unit 24. For example, as the temperature stimulation presentation unit 25, an appliance that can fix the Peltier element to the tooth, such as an orthodontic appliance, may be used.

Figure 2:
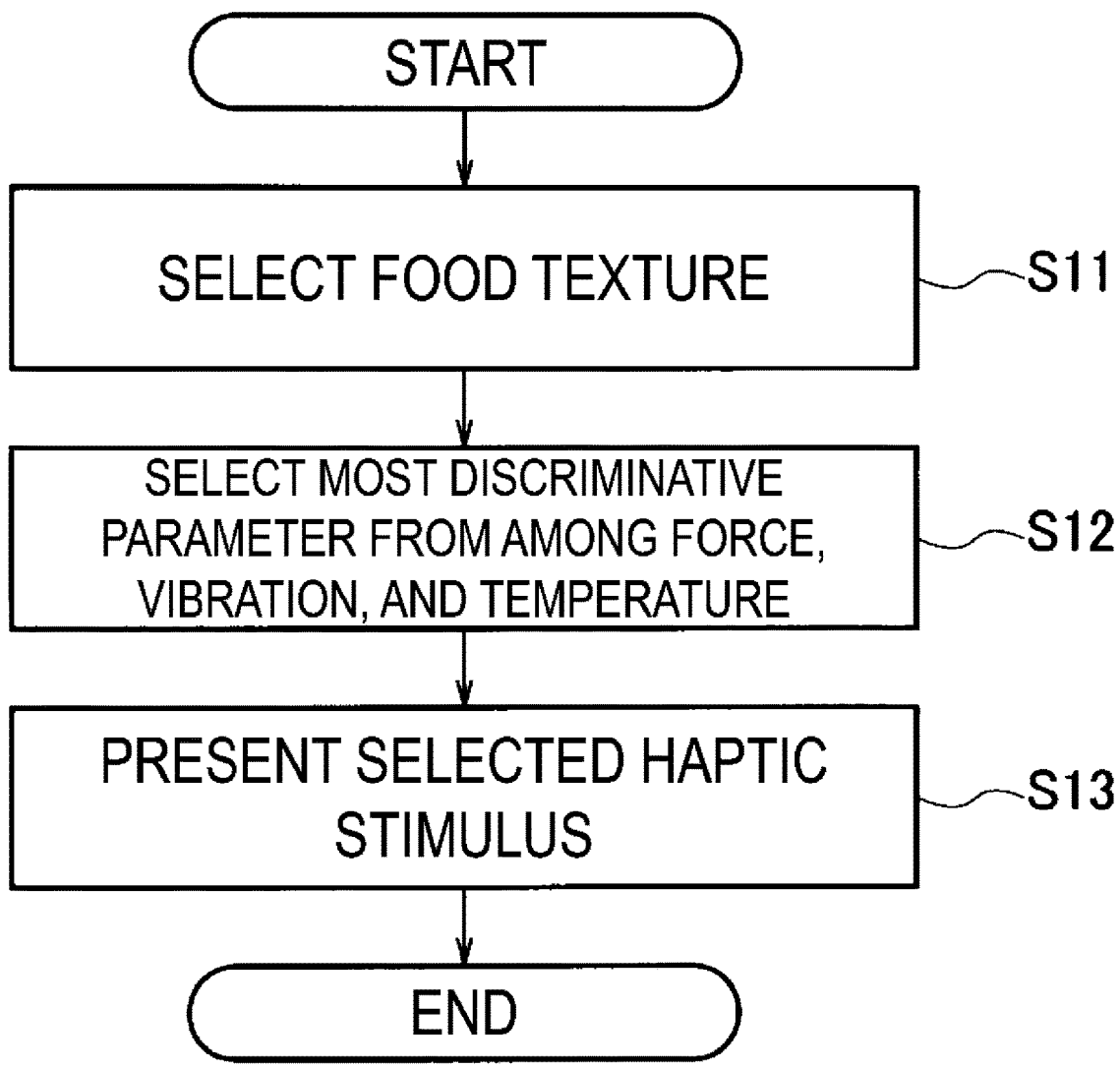
FIG. 2 is a flowchart illustrating a processing flow of the food texture presentation apparatus in the present embodiment.

Next, the operation of the food texture presentation apparatus 1 will be described with reference to the flowchart of FIG. 2.

In step S11, the food texture presentation apparatus 1 selects the food texture to be presented. The food texture presentation apparatus 1 may receive the food texture to be presented from the user.

In step S12, the food texture presentation apparatus 1 selects the haptic stimulus having the most discriminative parameter from among the force, the vibration, and the temperature for the food texture to be presented. When the onomatopoeia is used, the food texture presentation apparatus 1 selects the haptic stimulus mapped to the onomatopoeia.

The user inserts the presentation device 20 into the oral cavity and performs an operation of biting the presentation device 20.

In step S13, the food texture presentation apparatus 1 controls the presentation unit corresponding to the haptic stimulus selected in step S12 and presents the haptic stimulus to the user. When presenting the haptic stimulus of the force or the haptic stimulus of the vibration, the food texture presentation apparatus 1 operates the force stimulation presentation unit 23 or the vibration stimulation presentation unit 24, respectively, when the user bites the presentation device 20. When presenting the haptic stimulus of the temperature, the food texture presentation apparatus 1 operates the temperature stimulation presentation unit 25 without waiting for an action from the user. The food texture presentation apparatus 1 may operate the temperature stimulation presentation unit 25 when the user bites the presentation device 20.

As described above, the food texture presentation apparatus 1 of the present embodiment includes the force stimulation presentation unit 23, the vibration stimulation presentation unit 24, and the temperature stimulation presentation unit 25 that present different kinds of haptic stimuli in the oral cavity, the selection unit 11 that selects a haptic stimulus to be presented, according to the food texture, and the force stimulation controller 13, the vibration stimulation controller 14, and the temperature stimulation controller 15 that control respectively the force stimulation presentation unit 23, the vibration stimulation presentation unit 24, and the temperature stimulation presentation unit 25 that present the selected haptic stimulus. As a result, the haptic stimulus to be most emphasized is presented without synchronizing the haptic actuators that present the haptic stimuli, and thus the food texture can be presented without impairing reality.

Figure 3:
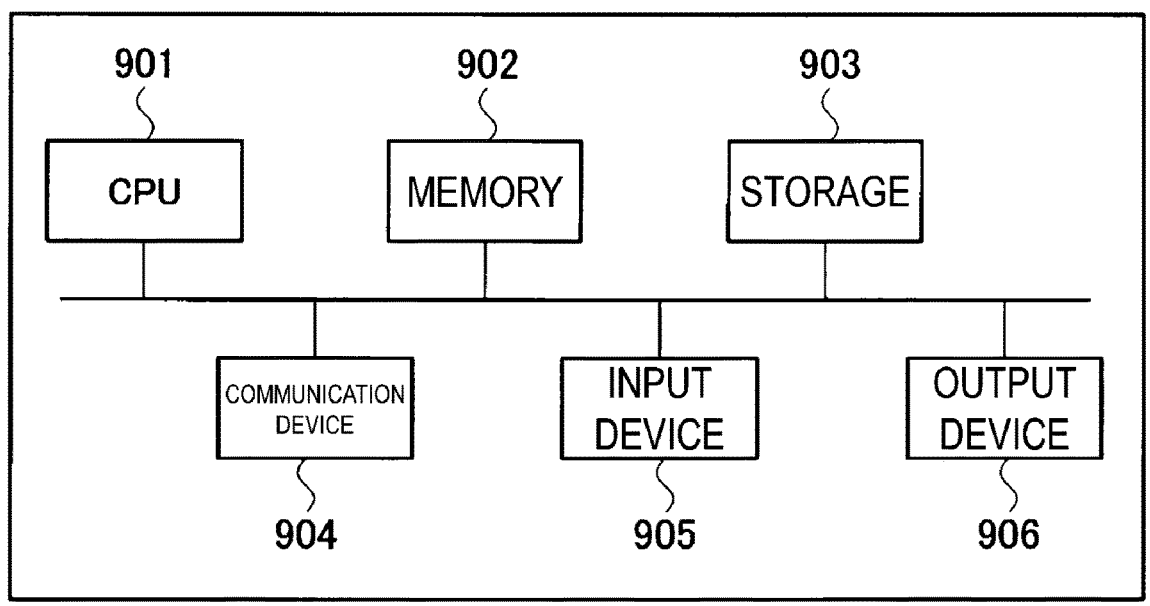
FIG. 3 is a diagram illustrating an exemplary hardware configuration of the food texture presentation apparatus.

As the food texture presentation apparatus 1 described above, for example, as illustrated in FIG. 3, a general-purpose computer system can be used, which includes a central processing unit (CPU) 901, a memory 902, a storage 903, a communication device 904, an input device 905, and an output device 906. In the computer system, the CPU 901 executes a predetermined program loaded in the memory 902 to achieve the food texture presentation apparatus 1. The program can also be recorded on a computer readable recording medium such as a magnetic disk, an optical disc, and a semiconductor memory or can also be distributed through a network.

REFERENCE SIGNS LIST

1 . . . Food texture presentation apparatus
10 . . . Selection device
11 . . . Selection unit
12 . . . Food texture database
13 . . . Force stimulation controller
14 . . . Vibration stimulation controller
15 . . . Temperature stimulation controller
20 . . . Presentation device
23 . . . Force stimulation presentation unit
24 . . . Vibration stimulation presentation unit
25 . . . Temperature stimulation presentation unit

The invention claimed is:

1. A food texture presentation apparatus comprising: a plurality of presentation units configured to present different kinds of haptic stimuli in an oral cavity; a selection unit, including one or more processors, configured to select one of the haptic stimuli according to a food texture to be presented; and a controller configured to control a presentation unit of the plurality of presentation units corresponding to the selected one of the haptic stimuli.

2. The food texture presentation apparatus according to claim 1, wherein the haptic stimuli include a force, a vibration, and a temperature.

3. The food texture presentation apparatus according to claim 1, wherein the food texture presentation apparatus holds a parameter to present the food texture for each of the haptic stimuli, and
the selection unit is configured to select, from among the haptic stimuli, a haptic stimulus where a value of the parameter deviates from a predetermined value.

4. The food texture presentation apparatus according to claim 1, wherein the selection unit is configured to select the one of the haptic stimuli based on onomatopoeia of the food texture to be presented.

5. A food texture presentation method of presenting a food texture by using a plurality of presentation units configured to present different kinds of haptic stimuli in an oral cavity, the food texture presentation method comprising: selecting, by a computer, one of the haptic stimuli according to the food texture to be presented; and controlling, by the computer, a presentation unit of the plurality of presentation units corresponding to the selected one of the haptic stimuli.

6. The food texture presentation method according to claim 5, wherein the haptic stimuli include a force, a vibration, and a temperature.

7. The food texture presentation method according to claim 5, wherein a parameter is held to present the food texture for each of the haptic stimuli, and
the food texture presentation method comprising:
selecting, from among the haptic stimuli, a haptic stimulus where a value of the parameter deviates from a predetermined value.

8. The food texture presentation method according to claim 5, comprising:
selecting the one of the haptic stimuli based on onomatopoeia of the food texture to be presented.

9. A non-transitory computer readable medium storing one or more instructions causing a computer to present a food texture by using a plurality of presentation units configured to present different kinds of haptic stimuli in an oral cavity, the one or more instructions causing the computer to execute: selecting one of the haptic stimuli according to the food texture to be presented; and controlling a presentation unit of the plurality of presentation units corresponding to the selected one of the haptic stimuli.

10. The non-transitory computer readable medium according to claim 9, wherein the haptic stimuli include a force, a vibration, and a temperature.

11. The non-transitory computer readable medium according to claim 9, wherein a parameter is held to present the food texture for each of the haptic stimuli, and
wherein the one or more instructions cause the computer to execute:
selecting, from among the haptic stimuli, a haptic stimulus where a value of the parameter deviates from a predetermined value.

12. The non-transitory computer readable medium according to claim 9, wherein the one or more instructions cause the computer to execute:
selecting the one of the haptic stimuli based on onomatopoeia of the food texture to be presented.

* * * * *